United States Patent Office 3,517,060
Patented June 23, 1970

3,517,060
CARBORANE COMPOUNDS
Burton Peter Block, Wayne, and Gerd Helmut Dahl, King of Prussia, Pa., assignors to Pennwalt Corporation, a corporation of Pennsylvania
No Drawing. Filed Feb. 8, 1966, Ser. No. 525,853
Int. Cl. C07f 9/34, 9/36
U.S. Cl. 260—543  5 Claims

ABSTRACT OF THE DISCLOSURE

Carborane compounds,

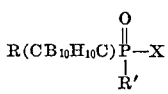

wherein R is H, lower alkyl or aryl, R' is $R(CB_{10}H_{10}C)$—, halogen, alkyl or aryl, and X is halogen or diloweralkylamino are useful as high energy propellants.

---

This invention relates to a new family of carborane compounds containing pentavalent phosphorus. More particularly, the invention is concerned with compounds having the structure:

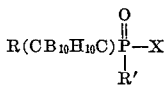

where R is H, a lower alkyl group, as for example, methyl, ethyl, propyl, isopropyl, butyl, isobutyl, tertiary butyl, and the like, or an aryl group (preferably hydrocarbon) of six to ten carbon atoms, $(CB_{10}H_{10}C)$ is the carborane group, R' is selected from the group consisting of $$R(CB_{10}H_{10}C)—$$

halogen, alkyl and aryl, preferably hydrocarbon containing from one to ten carbon atoms, and X is halogen (preferably bromine or chlorine) or di-lower-alkyl amino i.e.,

where R" and R''' are lower alkyl such as methyl, ethyl, propyl and butyl.

The compounds of the invention may be prepared by reacting the appropriate carborane lithium compound; i.e., a compound having the structure $R(CB_{10}H_{10}C)Li$ where R is as defined above, with a phosphorus compound of structure $R'P(O)Cl_2$, $R'P(O)ClN(R'')(R''')$ or $P(O)Cl_3$ where R', R" and R''' are as defined above. The reaction is carried out in an organic solvent system, preferably ether, and preferably the lithium compound is added to a solution of the phosphorus compound in ether. After the reaction is complete, the reaction mixture simply is filtered and the ether solvent evaporated to leave the product as a residue.

The compounds of the invention are crystalline solids and have sharp melting points. They are stable and are soluble in common organic solvents. The compounds of the invention are useful as high energy chemicals for high energy propellants due to their high boron and low carbon content, and they are also of value as intermediates to high energy polymers which will be found useful in high energy solid propellant systems.

In order to more fully illustrate the invention, the following examples are given.

EXAMPLE 1

An ether solution of lithio methyl carborane, prepared from 2.31 g. of methyl carborane and butyl lithium, was added to a cooled solution of 2.85 g. of $(C_6H_5)P(O)Cl_2$ in 100 ml. of anhydrous ether. After reflux for 2½ hr. the reaction mixture was filtered and the ether evaporated. The residue was recrystallized from hexane to yield 60% product.

Analysis.—Calculated for $C_9H_{18}B_{10}ClOP$ (percent): C, 34.11; H, 5.73; B, 34.15; P, 9.78; Cl, 11.19. Found (percent): C, 34.18; H, 5.72; B, 34.14; P, 10.09; Cl, 11.6. The structural formula for the compound is

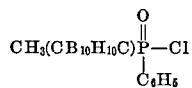

EXAMPLE 2

An ether solution of lithio methyl carborane, prepared from 3.28 g. of methyl carborane and butyl lithium, was added to a cooled solution of 1.59 g. of $P(O)Cl_3$ in 75 ml. of ether. After reflux for 2.5 hrs. the reaction mixture was filtered from LiCl and treated with water. After the ether layer was evaporated, the solid that remained was extracted with hexane. The crude product was recrystallized from ether and had a melting point of 176–180° C.

Analysis.—Calculated for $C_6H_{26}B_{20}ClOP$ (percent): C, 18.15; H, 6.60; B, 54.54; Cl, 8.93; P, 7.80. Found (percent): C, 18.44; H, 7.25; B, 54.67; P, 7.62. The structural formula for the compound is

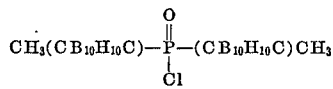

EXAMPLE 3

An ether solution of lithio phenyl carborane reacted with $(C_4H_9)P(O)Cl_2$ in accord with the procedure of Example 1 yields the compound corresponding to

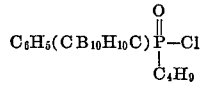

EXAMPLE 4

When Example 1 is repeated using carborane instead of methyl carborane, the product obtained is that of structure

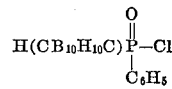

EXAMPLE 5

A solution of 3.876 g. of methyl-o-carborane was treated with n-butyl lithium and then added to 5.667 g. of $C_6H_5P(O)ClN(C_2H_5)_2$ in diethyl ether. Upon filtration from the precipitated LiCl a solid was recovered on the steam bath from the ether solution. Several recrystallizations from hexane and diethyl ether yielded a colorless solid, M.P. 114–116° C.

Analysis.—Calculated for $C_{13}H_{28}B_{10}N,O,P$. Found (percent): C, 44.39; H, 8.16; N, 3.88; P, 8.90; B, 30.27. Calculated (percent): C, 44.16; H, 7.98; N, 3.96; P, 8.76; B, 30.61.

Additional examples illustrating the compounds of the invention are

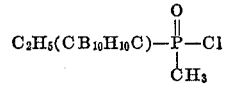

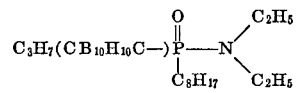

3

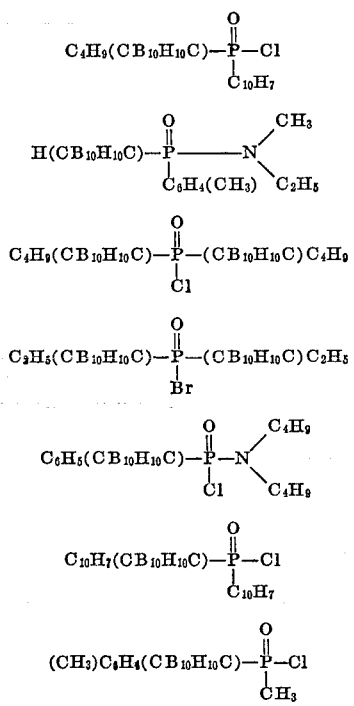

It will be understood that numerous changes and variations may be made from the above description and examples without departing from the spirit and scope of the invention.

We claim:
1. Compounds of the formula

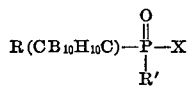

4 where $(CB_{10}H_{10}C)$ is a carborane moiety, R is H, lower alkyl or aryl, R′ is $(RCB_{10}H_{10}C)$—, halogen, alkyl or aryl, and X is halogen or diloweralkylamino.

2. A compound as in claim 1 of the formula

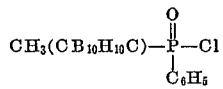

3. A compound as in claim 1 of the formula

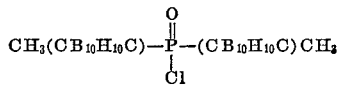

4. A compound as in claim 1 of the formula

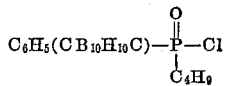

5. A compound as in claim 1 of the formula

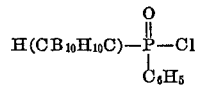

References Cited
UNITED STATES PATENTS
3,320,185   5/1967   Alexander et al.

OTHER REFERENCES
Alexander et al.: "Inorg. Chem.," vol. 2 (1963), pp. 1107–1110.
"Chemical and Engineering News," Dec. 9, 1963, pp. 62–70.

LEON ZITVER, Primary Examiner
J. E. EVANS, Assistant Examiner

U.S. Cl. X.R.
149—109; 260—2, 551, 606.5